(12) United States Patent
Quan et al.

(10) Patent No.: US 8,824,827 B2
(45) Date of Patent: Sep. 2, 2014

(54) SYSTEMS, METHODS, AND APPARATUS FOR EXPOSURE CONTROL

(75) Inventors: Shuxue Quan, San Diego, CA (US); Chinchuan Andrew Chiu, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/344,514

(22) Filed: Jan. 5, 2012

(65) Prior Publication Data

US 2012/0105675 A1 May 3, 2012

Related U.S. Application Data

(63) Continuation of application No. 11/378,720, filed on Mar. 17, 2006, now Pat. No. 8,107,762.

(51) Int. Cl.
*G06K 9/00* (2006.01)
*G06K 9/62* (2006.01)
*G06K 9/40* (2006.01)
*H04N 5/235* (2006.01)

(52) U.S. Cl.
USPC ........... 382/274; 382/162; 382/165; 382/167; 382/224; 382/254; 348/221.1

(58) Field of Classification Search
USPC ................. 382/274, 162, 165, 167, 224, 254; 348/221.1
See application file for complete search history.

(56) References Cited

U.S. PATENT DOCUMENTS

| | | |
|---|---|---|
| 4,974,017 A | 11/1990 | Terashita |
| 5,281,995 A | 1/1994 | Terashita et al. |
| 5,907,629 A | 5/1999 | Funt et al. |
| 6,072,526 A | 6/2000 | Hashimoto et al. |
| 6,088,137 A | 7/2000 | Tomizawa |
| 6,088,317 A | 7/2000 | Kim et al. |
| 6,249,317 B1 | 6/2001 | Hashimoto et al. |
| 6,707,940 B1 | 3/2004 | Qian |
| 6,785,414 B1 | 8/2004 | McStravick, III et al. |
| 7,129,980 B1 | 10/2006 | Ashida |
| 7,728,904 B2 | 6/2010 | Quan et al. |
| 7,778,483 B2 * | 8/2010 | Messina et al. ............... 382/274 |
| 8,107,762 B2 | 1/2012 | Quan et al. |
| 2003/0071908 A1 | 4/2003 | Sannoh et al. |

(Continued)

FOREIGN PATENT DOCUMENTS

| | | |
|---|---|---|
| EP | 1482724 | 12/2004 |
| JP | 8172572 A | 7/1996 |

(Continued)

OTHER PUBLICATIONS

Chai, D.—"A Bayesian Approach to Skin Color Classification in YCbCr Color Space"—IEEE 2000, pp. 421-424.*

(Continued)

*Primary Examiner* — Bernard Krasnic
(74) *Attorney, Agent, or Firm* — James R. Gambale, Jr.

(57) ABSTRACT

Systems, methods and apparatus for image processing by classifying pixels are described. In some systems, an exposure control operation is performed according to the pixel classifications. In some cases, the pixels are classified according to a predetermined segmentation of a color space, based on predicted sensor responses.

19 Claims, 11 Drawing Sheets

(56) References Cited

U.S. PATENT DOCUMENTS

| | | |
|---|---|---|
| 2003/0156206 A1 | 8/2003 | Ikeda et al. |
| 2004/0090534 A1* | 5/2004 | Nakami et al. ............. 348/220.1 |
| 2004/0179719 A1 | 9/2004 | Chen et al. |
| 2004/0268201 A1 | 12/2004 | Haider et al. |
| 2005/0018923 A1* | 1/2005 | Messina et al. ............... 382/274 |
| 2005/0031325 A1 | 2/2005 | Fujii |
| 2005/0046730 A1 | 3/2005 | Li |
| 2005/0083352 A1 | 4/2005 | Higgins |
| 2005/0207643 A1 | 9/2005 | Lee et al. |
| 2005/0225562 A1 | 10/2005 | Higgins et al. |
| 2005/0243349 A1 | 11/2005 | Aoyama |
| 2006/0088209 A1 | 4/2006 | Yu et al. |
| 2006/0088210 A1 | 4/2006 | Yu et al. |
| 2006/0256858 A1 | 11/2006 | Chin |
| 2006/0257132 A1* | 11/2006 | Shiffer et al. ................. 396/158 |

FOREIGN PATENT DOCUMENTS

| | | |
|---|---|---|
| JP | O9044670 | 2/1997 |
| JP | O9284784 | 10/1997 |
| JP | 2000041178 | 2/2000 |
| JP | 2002314874 | 10/2002 |
| JP | 2004040462 | 2/2004 |
| JP | 2005165684 | 6/2005 |
| JP | 2005311484 A | 11/2005 |
| JP | 2006025411 A | 1/2006 |
| WO | WO2004051573 A2 | 6/2004 |
| WO | WO2007022413 | 2/2007 |

OTHER PUBLICATIONS

Hsu, et al. (2002) Face detection in color images. IEEE Transactions on Pattern Analysis and Machine Intelligence, vol. 24(5), 696-706.

International Preliminary Report on Patentability—PCT/US2007/064332, The International Bureau of WIPO—Geneva, Switzerland, Aug. 17, 2011.

International Search Report and Written Opinion—PCT/US2007/064332, International Search Authority—European Patent Office—Feb. 14, 2011.

Messina, G., et al. (2003) Image quality improvement by adaptive exposure correction techniques. IEEE, ICME 2003, pp. I-549-I-552.

Partial International Search Report—PCT/US2007/064332—International Search Authority, European Patent Office, Jul. 1, 2010.

Sanger D, et al., "Method for Light Source Discrimination and Facial Pattern Detection From Negative Color Film" Journal of Imaging Science and Technology, Society of Imaging Science & Technology, Springfield, VA, US, vol. 39, No. 2, Mar. 1, 1995, pp. 166-175, XP000197839 ISSN: 1062-3701 the whole document.

* cited by examiner

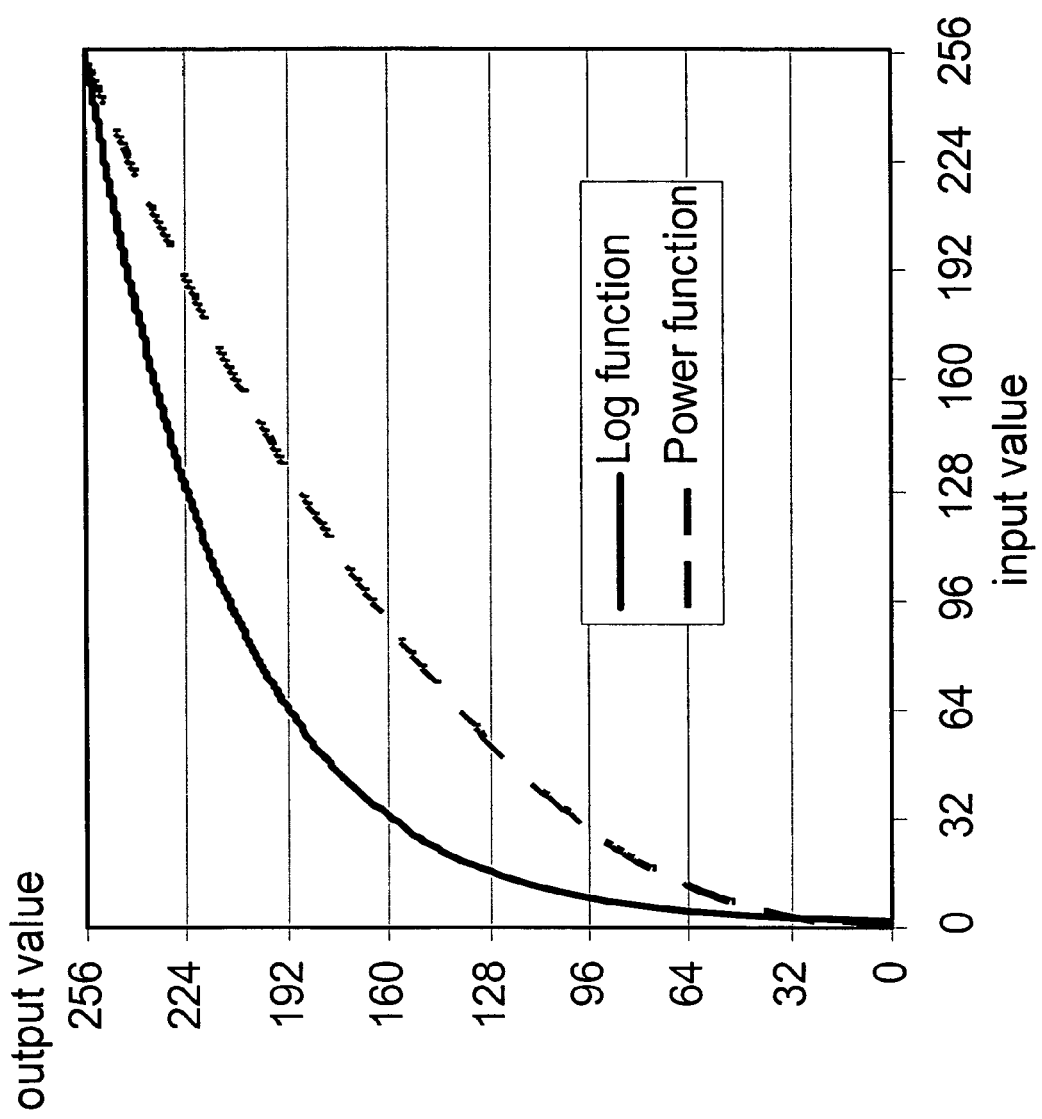

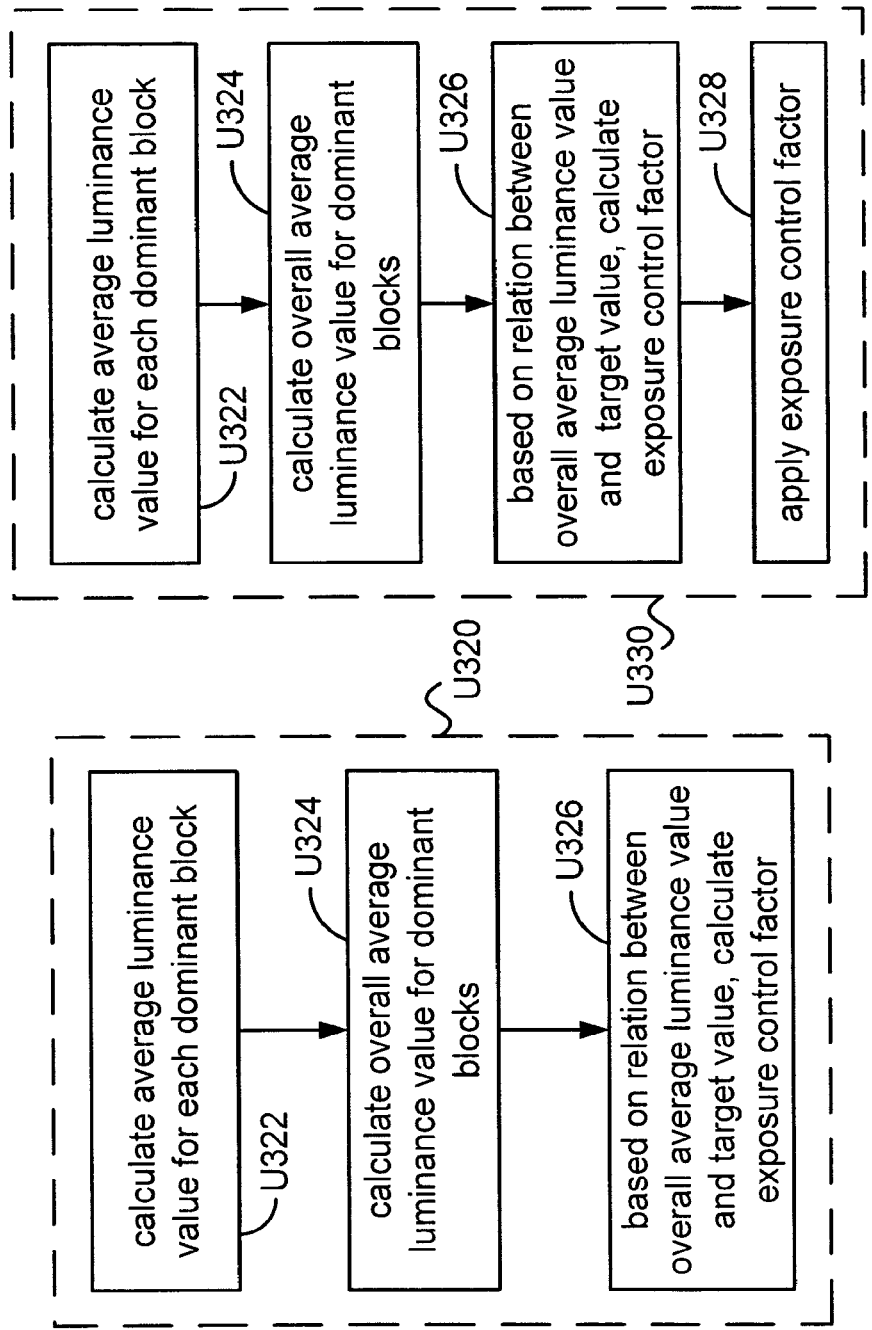

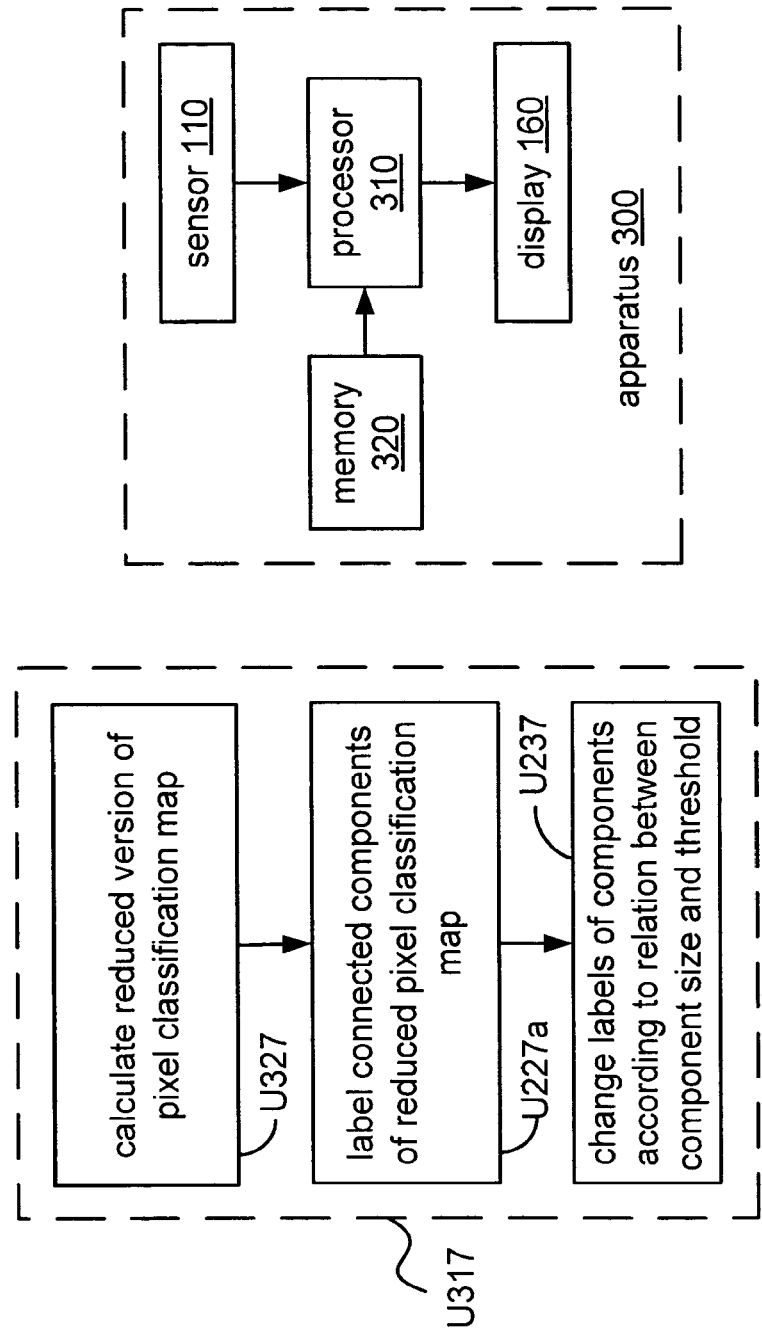

SYSTEMS, METHODS, AND APPARATUS FOR EXPOSURE CONTROL

RELATED APPLICATIONS

This is a continuation application of U.S. application Ser. No. 11/378,720 filed on Mar. 17, 2006, the contents of which are hereby incorporated by reference in its entirety.

FIELD OF THE INVENTION

This invention relates to image processing and classifying pixels in digital images.

BACKGROUND

It is customary for a camera or other imaging or image processing apparatus to perform some type of exposure control operation. During image capture, for example, an exposure control operation may be performed to match a range of apparent radiances within a scene to a dynamic range of a photosensitive substrate (e.g., photographic film or paper) or image sensor (e.g., a CCD (charge coupled device) or CMOS (complementary metal oxide semiconductor) array) within the apparatus. Such an operation may include varying a shutter speed and/or a lens aperture stop of the apparatus.

Exposure control operations according to several different photometric modes are known. One such mode is frame-averaged exposure control, in which the exposure is controlled according to an average brightness level of the scene or image. Another photometric mode of exposure control is center-weighted exposure control, in which the exposure control is weighted according to a brightness level of a center region of the scene or image.

Existing methods of exposure control may produce suboptimal results when the scene being photographed includes one or more people, or when the image being processed is a portrait or other depiction of one or more people. A frame-averaged scheme, for example, may produce an image of a person that is too bright if the person is highlighted or too dark if the person is backlit.

A photograph may appear more aesthetically pleasing when the principal object of interest (e.g., a human face) is positioned off-center. One favored placement of such an object is in accordance with the Golden Ratio: in other words, at a distance from either edge, along the vertical and/or horizontal dimension, of about 61.8% of the size of the image in that dimension. When used with a scene or image that is composed in this manner, a center-weighted exposure control scheme may produce a result in which the principal object of interest is inappropriately exposed.

It is desirable to obtain an image in which a principal object of interest, such as a human face, is appropriately exposed.

SUMMARY

A method of image processing according to one embodiment includes classifying each of a plurality of pixels of the image according to a predetermined segmentation of a color space. The method also includes performing, based on a result of the classifying each of a plurality of pixels, an exposure control operation. The image is based on a raw image captured by a sensor, and the predetermined segmentation of the color space is based on a plurality of predicted responses of the sensor.

An exposure control apparatus according to another embodiment includes a sensor configured to capture a raw image and a pixel classifier configured to classify, according to a predetermined segmentation of a color space, pixels of an image based on the raw image. The apparatus also includes an exposure controller configured to perform, based on the pixel classifications, an exposure control operation. The predetermined segmentation of a color space is based on a plurality of predicted responses of the sensor.

BRIEF DESCRIPTION OF THE DRAWINGS

FIG. 2 shows plots of a logarithmic function for gamma correction and a power function for gamma correction.

FIG. 3a shows a flowchart of an implementation U320 of exposure control task U224.

FIG. 3b shows a flowchart of an implementation U330 of exposure control task U320.

FIG. 8 shows a flowchart of an implementation U317 of noise reduction task U217.

FIG. 9 shows a block diagram of an apparatus 300 according to an embodiment.

DETAILED DESCRIPTION

Embodiments include systems, methods, and apparatus configured to perform an exposure control operation based on predicted sensor responses. Embodiments also include systems, methods, and apparatus configured to perform an exposure control operation based on a selected color.

Applications of embodiments described herein include adaptive exposure correction and skin-color-prioritized adaptive exposure control. For example, at least some embodiments may be applied to enable reproduction of the most important regions of an image with a brightness level more or less in the middle of the available range.

It is expressly contemplated that principles disclosed herein may be used in conjunction with operations, elements, and arrangements disclosed in the co-assigned, co-pending U.S. patent application Ser. No. 11/208,261, entitled "SYSTEMS, METHODS, AND APPARATUS FOR IMAGE PROCESSING, FOR COLOR CLASSIFICATION, AND FOR SKIN COLOR DETECTION," filed Aug. 18, 2005, and the entire disclosure of that application is hereby incorporated by reference as if explicitly reproduced herein.

Figures 1A, 1B:
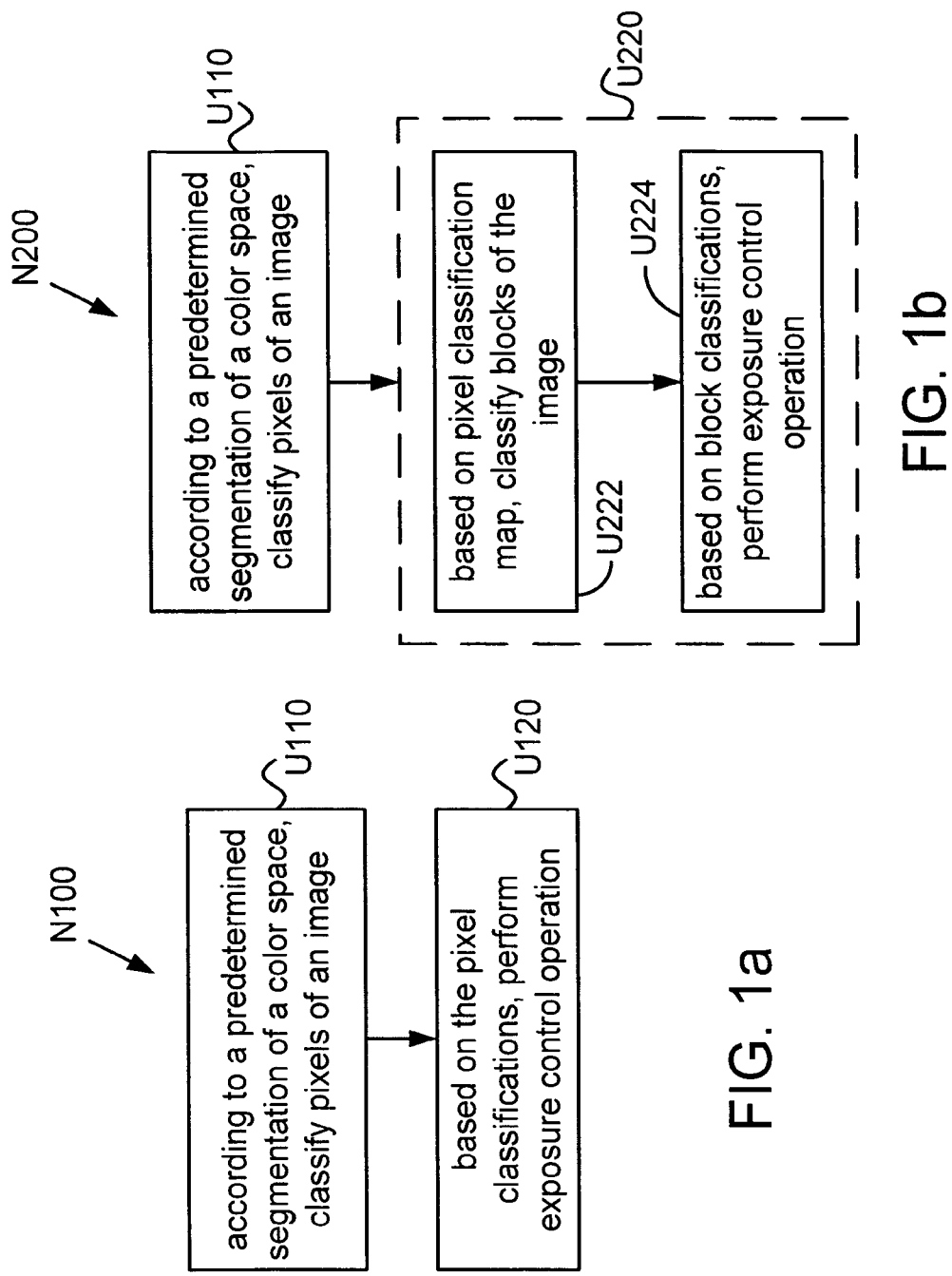
FIG. 1a is a flowchart of a method N100 according to an embodiment.
FIG. 1b is a flowchart of an implementation N200 of method N100.

FIG. 1a shows a flowchart of a method of exposure control N100 according to an embodiment. Task U110 classifies pixels of an image i150 (FIG. 4a) according to a predetermined segmentation of a color space. Task U120 performs an exposure control operation based on the pixel classifications.

Figure 4A:
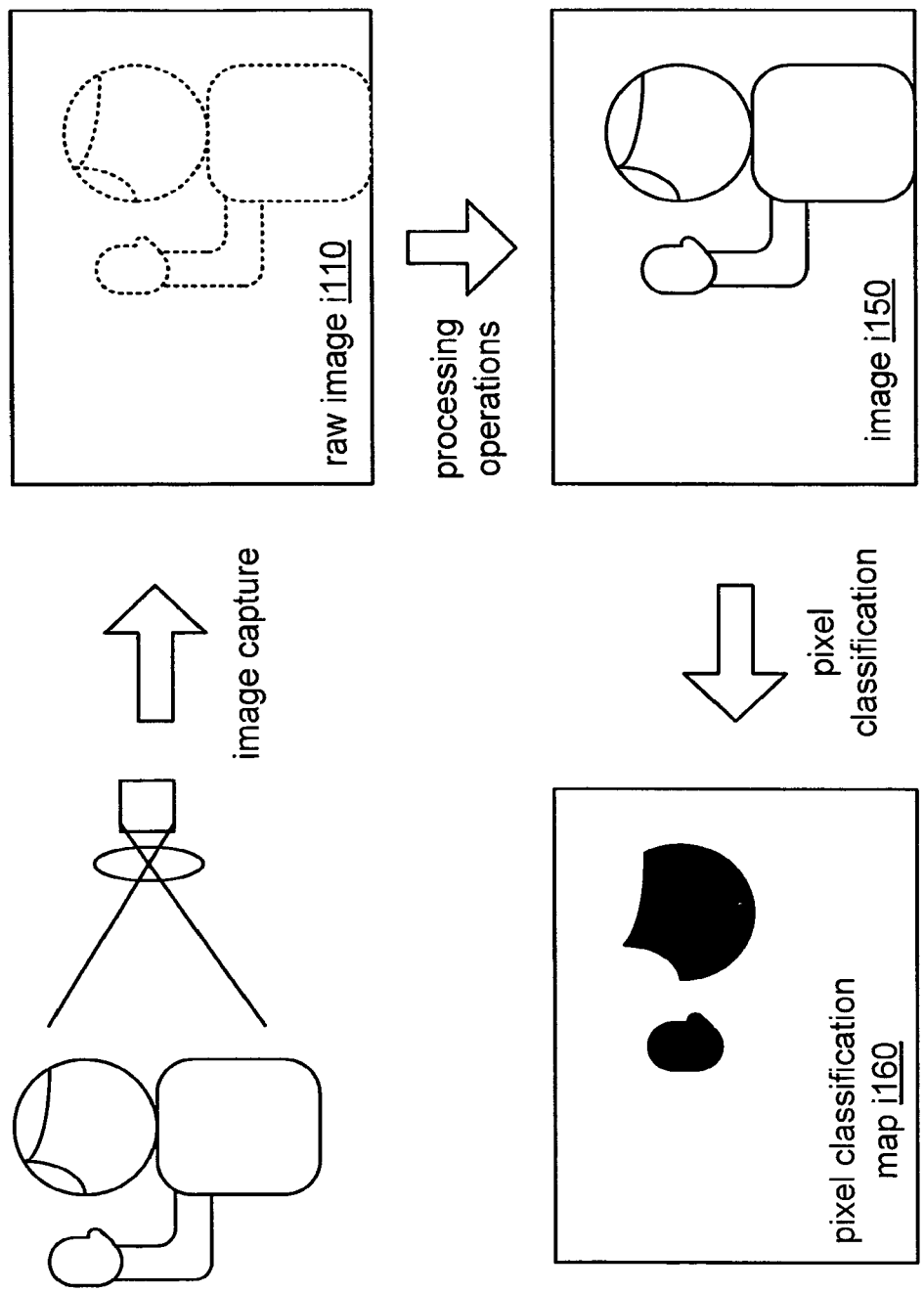
FIGS. 4a and 4b show one example of a sequence according to an implementation of method N100.

Image i150 in FIG. 4a is based on a raw image i110 captured by an imaging sensor, such as a CCD or CMOS array. Image i150 may be obtained from raw image i110 by performing processing operations such as de-mosaicing, white balance, black clamping, gamma correction, color correction, and/or color conversion. Examples of such operations, arrangements including them, and apparatus configured to perform them are described in the incorporated U.S. patent application Ser. No. 11/208,261. In some cases, one or more such operations may be performed within the imaging sensor.

At least some processing operations may include (A) calculating average values of parameters over blocks or zones described by a partitioning of the image, and (B) calculating, based on one or more of those average values, a global value to be applied to the image. For example, processing of raw image i110 into image i150 may include performing an autofocus, exposure control, and/or white balance operation, one or more of which may be executed according to a partitioning of the image.

Processing of raw image i110 may be important for obtaining an image i150 whose pixels may be reliably classified in a subsequent task. For example, it may be desirable or necessary to perform a preliminary exposure control operation to obtain image i150. This exposure control operation may be frame-averaged or center-weighted, and it may be implemented by calculating a gain factor to be applied to each pixel of the image (e.g., to each color value of an RGB (red, green, blue) value, or to the luminance value of a YCbCr (luma and chroma) value).

In some configurations, the exposure control operation includes calculating the gain factor according to a partitioning of the image as described above. In such case, the operation may include calculating an average luminance value for each block in the image or in a particular region (e.g., the center) of the image, and calculating the gain factor based on one or more of those averages (for example, based on an average of those averages). The gain factor may be calculated before performing a gamma correction operation, in which case the gain factor may be selected to scale the average luminance level to about 50 of 256 levels (or an equivalent thereof) across the image or selected region. Alternatively, the gain factor may be calculated after performing a gamma correction operation, in which case the gain factor may be selected to scale the average luminance level to about 110 of 256 levels (or an equivalent thereof) across the image or selected region.

Processing operations may also include a focus control operation as described, for example, in co-assigned U.S. Provisional Pat. Appl. No. 60/734,992, entitled "SKIN COLOR PRIORITIZED AUTOMATIC FOCUS CONTROL VIA SENSOR-DEPENDENT SKIN COLOR," filed Nov. 8, 2005. In some cases, it may be desirable to reconfigure a camera or other imaging apparatus according to the results of an exposure control and/or focus control operation and to recapture raw image i110 according to the new configuration.

As disclosed in U.S. patent application Ser. No. 11/208,261 incorporated herein, processing raw image i110 to obtain image i150 may include performing a gamma correction operation. Such an operation may be configured to correct the pixel color values in a primary color space: for example, by correcting each component of an RGB pixel value. Alternatively, such an operation may be configured to correct the pixel color values in a luminance-chrominance color space: for example, by correcting the luminance component of a YCbCr pixel value.

Gamma correction operations are typically based on a power function of the input value. In one example, output values y are calculated from corresponding input values x according to the expression $y=mx^{1/g}$. In this example, g denotes the gamma correction factor (one typical value is 2.2), and m denotes a mapping constant that may be selected according to the desired output range.

Instead of a conventional power function, an embodiment may be configured to perform a gamma correction operation according to a logarithmic function instead. One example of an expression including such a function is $y=m \log x$, where m denotes a mapping constant that may be selected according to the desired output range. In particular, such a function using a logarithm of base 2 may typically be calculated at less computational expense than a power function. FIG. 2 shows plots of examples of each type of function, where the log function is $y=32 \log_2 x$, and the power function is $y=255^{0.55} x^{0.45}$. In some cases, the computational complexity of a gamma correction operation, and/or the processor cycles and/or storage space consumed by such an operation, may be reduced by approximating all or part of the gamma correction function with one or more linear or polynomial functions, such as in a piecewise linear implementation.

As disclosed in U.S. patent application Ser. No. 11/208,261 incorporated herein, it may be desirable to convert an image from one color space to another. For example, it may be desirable to convert an image from a native color space of the sensor (e.g., RGB or sRGB) to a color space such as YCbCr for processing, encoding, and/or compression. A conversion matrix may be applied to perform such a conversion, as in the following expression:

$$\begin{bmatrix} +0.289 & +0.587 & +0.114 \\ -0.169 & -0.441 & +0.500 \\ +0.500 & -0.418 & -0.081 \end{bmatrix} \begin{bmatrix} R_{sRGB} \\ G_{sRGB} \\ B_{sRGB} \end{bmatrix} = \begin{bmatrix} Y \\ C_b \\ C_r \end{bmatrix}.$$

Any of several similar known matrices (e.g., ITU-R BT.601, ITU-R BT.709) for conversion between a primary color space (e.g., RGB, sRGB) and a luminance-chrominance space (e.g., YCbCr, YPbPr), or an equivalent of such a matrix, may also be used.

In a further example, a simplified conversion matrix may be used, as in the following expression:

$$\begin{bmatrix} +1/4 & +1/2 & +1/4 \\ 0 & -1 & +1 \\ +1 & -1 & 0 \end{bmatrix} \begin{bmatrix} R \\ G \\ B \end{bmatrix} = \begin{bmatrix} Y \\ C_b \\ C_r \end{bmatrix}.$$

One potential advantage of this matrix is that it may be applied without any multiplications because the factors ½ and ¼ may be implemented as right-hand shifts of one and two bits, respectively, for at least some fixed-point implementations of a method according to an embodiment.

The following expression describes another color space conversion that may be performed using shifts:

$Y=R/4+G/2+B/4;$ $C_b=B-Y;$ $C_r=R-Y.$

In a further example, either of the two simplified conversions above is modified to calculate Y according to the expression:

$$Y=(2\times R+4\times G+G+B)/8.$$

Task U110 classifies pixels of image i150 according to a predetermined segmentation of a color space. The segmentation may be described by a single boundary that indicates the desired color range (e.g., human skin color). In this case, task U110 assigns each pixel to one of a "matched" class and an "unmatched" class according to whether its color value is within or outside of the boundary, respectively. Pixels having color values on the boundary, if any, are assigned to one class or the other according to a design choice.

Alternatively, the segmentation region may be described by multiple boundaries. In particular, task U110 may use different segmentation boundaries (such as ellipses) in the CbCr plane to describe a single segmentation region within different ranges of luminance levels, as described in the incorporated U.S. patent application Ser. No. 11/208,261. In such case, task U110 assigns each pixel to one of a matched class and an unmatched class according to whether its CbCr value is within or outside of the appropriate boundary, respectively.

In a typical implementation, task U110 (FIG. 1a) is configured to produce a map i160 (FIG. 4a) that indicates the classification result for each pixel. Pixel classification map i160 may be binary, such that each element of the map has a binary value indicating whether a color value of the corresponding pixel of image i150 is within the desired segmentation region (in other words, indicating the class to which the pixel has been assigned).

Alternatively, task U110 may be implemented to produce a pixel classification map whose elements may have non-binary values. In one example of such a map, each element indicates a degree of matching between a color value of the corresponding pixel of image i150 and a corresponding segmentation criterion. The degree of matching may be based on a distance between a color value of the pixel and a desired color value or range. For example, this distance may be used to calculate the degree of matching or to retrieve the degree of matching from a table.

Alternatively, the degree of matching may be indicated by which of two or more segmentation boundaries a corresponding pixel value falls within, where the boundaries may describe concentric regions. In such case, task U110 may assign each pixel to one of more than two classes, each class corresponding to a different segmentation region and corresponding degree of matching.

It may be desired to configure task U110 to produce a pixel classification map having fewer elements than image i150. Task U110 may be configured to produce such a map by classifying color values of regions that correspond to more than one pixel of image i150. These regions may be overlapping or non-overlapping. In one example, task U110 is configured to classify average color values of non-overlapping regions of 3×3 pixels. In this case, the resulting pixel classification map has only about one-ninth as many elements as image i150. In another example, non-overlapping regions of 5×5 pixels are used.

In an alternative arrangement configured to produce a pixel classification map having fewer elements than image i150, processing of raw image i110 to obtain image i150 includes scaling the image to a smaller size, such that pixel classification task U110 is performed on a smaller image. In such case, it may be desired to use the reduced-size image only for processing purposes, and to perform the resulting exposure control operation on an image of the original size.

It may be desired for task U110 to perform a pixel classification according to a segmentation that is based on one or more characteristics of an imaging sensor used to capture raw image i110. Sensor characterization is described in the incorporated U.S. patent application Ser. No. 11/208,261, which also discloses systems, methods, and apparatus that are configured to obtain and/or to apply segmentations based on one or more sets of predicted sensor responses to human skin color.

It may be desired to select a segmentation to be applied in task U110 from among more than one alternative. For example, task U110 may be configured to select one among several different segmentations according to an illuminant of the scene depicted in raw image i110. The incorporated U.S. patent application Ser. No. 11/208,261 discloses techniques of identifying a scene illuminant.

Task U120 performs an exposure control operation based on the pixel classification map. The exposure control operation may be implemented by calculating and applying one or more exposure control factors during image capture and/or during processing of a captured image. Task U120 may be configured to perform the exposure control operation on image i150, on a subsequent image, and/or on more than one subsequent images (e.g., in a video stream).

In one example, task U120 selects, computes, or otherwise calculates an exposure control factor that may be used during image capture to control aspects of an apparatus such as a shutter speed and/or sensitivity of an imaging sensor (e.g., a CCD or CMOS array), an aperture stop of a lens diaphragm or iris, and/or a gain of an AGC (automatic gain control) circuit. Alternatively or additionally, the exposure control operation may include controlling a flash illumination operation of a flashtube or LED (light emitting diode) of the apparatus. A flash illumination operation may also be based on distance information obtained, for example, during a focus control operation.

In another example, task U120 selects, computes, or otherwise calculates an exposure control factor that may be used during image processing, such as a gain factor applied to change the overall brightness level of the image. Such an operation may be performed to enhance the appearance of a particular part of the image (such as human skin color or another selected color) and/or to match a range of luminance levels in the image to a desired dynamic range (such as a dynamic range of a display). An exposure control operation of this type may include varying a gain factor to be applied to color channels, or to a luminance channel, of the image.

Task U120 may be configured to calculate an exposure control factor according to a partitioning of the image. FIG. 1b shows a flowchart of an implementation N200 of method N100 that includes such an implementation U220 of exposure control task U120. Task U220 includes task U222, which classifies blocks of image i150 based on the pixel classification map, and task U224, which performs an exposure control operation based on the block classifications.

Task U222 classifies blocks of image i150 that are described by a partitioning. In a typical example, the partitioning divides image i150 according to a grid that describes an 8×8 or 16×16 array of non-overlapping blocks, each block having a size of about 100×100 pixels. Any other grid or block size may be used, however. Each block need not have the same size, and a partitioning that includes overlapping blocks is also possible. For a case in which a partitioning is used to obtain image i150 from a raw capture image, task U222 may be configured to use the same partitioning.

Task U222 classifies each block according to the class memberships indicated in a corresponding area of the pixel classification map. For a typical case in which each pixel is assigned to either a matched class or an unmatched class, task U222 is configured to classify each block by determining the number (or proportion) of its pixels that have been assigned to the matched class and comparing that value to a threshold. Blocks for which the value exceeds the threshold are assigned to one of two classes (a "dominant" class), and blocks for which the value is less than the threshold are assigned to the other class (a "nondominant" class). Blocks for which the value is equal to the threshold, if any, may be classified as dominant or nondominant according to a design choice. A typical value for the threshold is one-half (e.g., one-half of the total number of pixels in the block), although any other suitable value may be used, and a block may be classified as dominant even if a threshold of less than one-half is used.

In other implementations, more than one threshold may be used, such that a block may be assigned to one among more than two classes of relative dominance. In a case where pixels may be assigned to one of more than two segmentation classes, task U222 may be configured to calculate a degree of matching as a weighted combination of the number (or proportion) of pixels of the block that belong to each of two or more of those classes, and to compare the threshold value or values to this degree.

Task U224 calculates an exposure control factor based on the block classifications. In a typical example, task U224 is configured to calculate an exposure control factor based on one or more characteristics of the dominant blocks, such as an average luminance value of the dominant blocks. In other implementations, task U224 may be configured to calculate an exposure control factor that is also based on one or more characteristics of nondominant blocks.

FIG. 3a shows a flowchart of an implementation U320 of task U224 that includes tasks U322, U324, and U326. Task U322 calculates an average luminance value for each dominant block. This average is typically calculated as the average (e.g., mean or median) Y value of the pixels in the block, although it may also be calculated from RGB pixel values. In other implementations, task U322 is configured to calculate an average luminance value for each of one or more nondominant blocks as well. In such case, task U322 may be configured to calculate an average luminance value for each nondominant block in a particular region of the image (e.g., the center) and/or in a particular nondominant class. Alternatively, task U322 may be configured to calculate an average luminance value for each block in the image.

Based on the average luminance values for the dominant blocks, task U324 calculates an overall average luminance value. In a typical example, task U324 is configured to calculate the overall average luminance value as an average (e.g., mean or median) of the average luminance values for the dominant blocks.

In other implementations, task U324 may be configured to calculate the overall average luminance value based on average luminance values of nondominant blocks as well. For example, task U324 may be configured to calculate the overall average luminance value according to one of the following two expressions:

$$\left. \begin{array}{l} 1)\ avg_{overall} = w_1 avg_D + w_2 avg_N \\ 2)\ avg_{overall} = w_1 avg_D + w_2 avg_T \end{array} \right\} w_1 > w_2,\ w_1 + w_2 = 1$$

where $avg_{overall}$ denotes the overall average luminance value, $avg_D$ denotes an average of the average luminance values of the dominant blocks, $avg_N$ denotes an average of the average luminance values of all of the nondominant blocks being referenced in the calculation, $avg_T$ denotes an average of the average luminance values of all of the blocks being referenced in the calculation, and $w_1$, $w_2$ denote respective weighting factors. In some implementations, the ratio between $w_1$ and $w_2$ is adjustable by a user of the apparatus.

For an implementation in which each block is assigned to one of more than two classes, task U324 may be configured to calculate the overall average luminance value according to an expression such as the following:

$$avg_{overall} = \sum_i w_i avg_i,\ \sum_i w_i = 1,$$

where $avg_i$ denotes the average of the average luminance values of the blocks of class i being referenced in the calculation, and $w_i$ denotes the weighting factor for class i, with larger weighting factors typically being used for classes having a higher degree of matching.

Based on a relation between the overall average luminance value and a desired target luminance value, task U326 calculates an exposure control factor. For example, task U326 may be configured to calculate the exposure control factor as the ratio of the target luminance value to the overall average luminance value. Typical examples of a target luminance value include 50, 55, and 60 of 256 levels (or equivalents thereof).

FIG. 3b shows a flowchart of an implementation U330 of task U320, which includes a task U328 configured to apply the exposure control factor. In one example, task U328 is configured to multiply the luminance value of each pixel of image i150 by the exposure control factor. In another example, task U328 is configured to apply the exposure control factor to control, during an image capture operation, a parameter such as aperture, shutter speed, sensor sensitivity, and/or flash intensity.

Figure 4B:
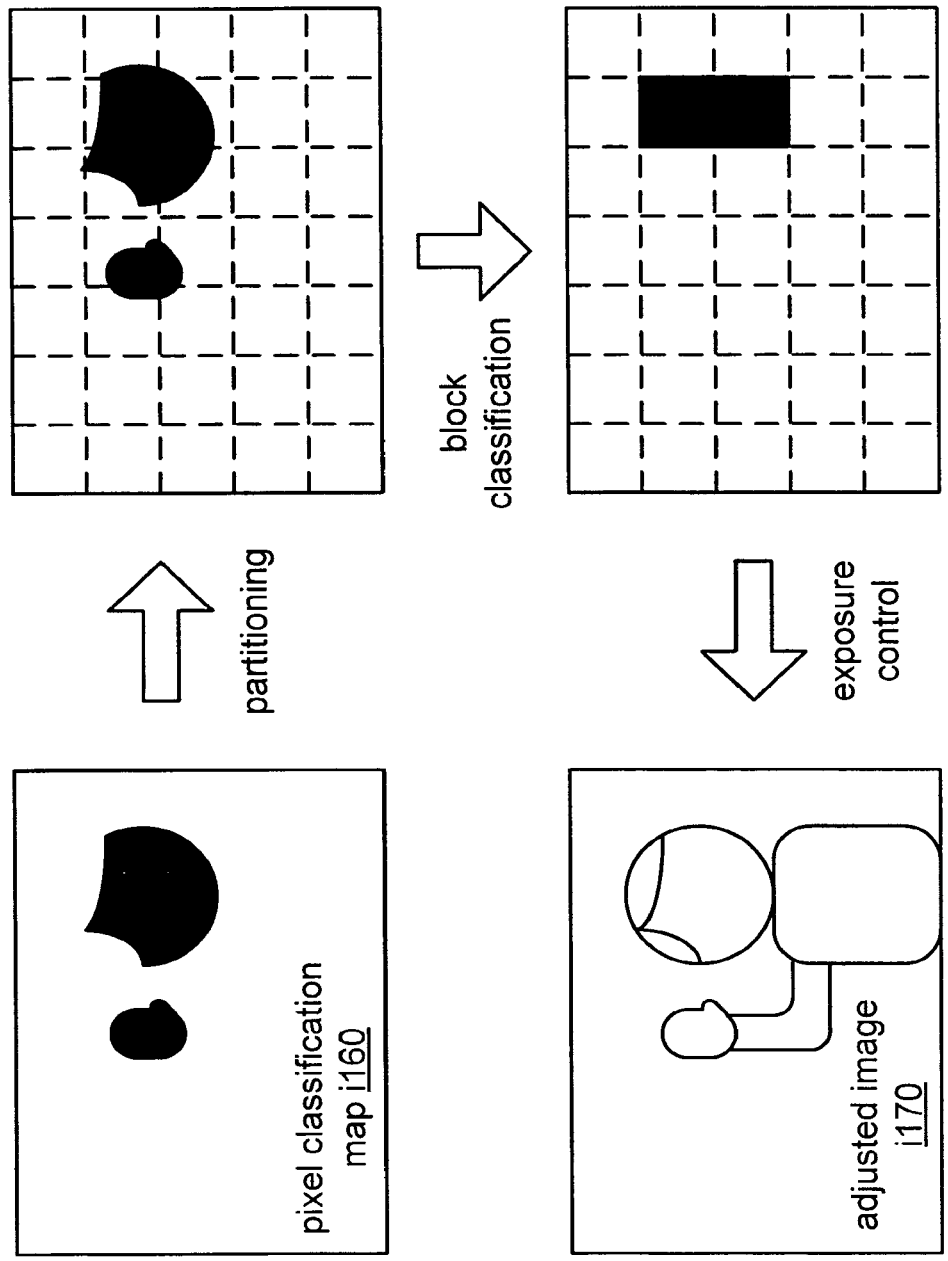

FIGS. 4a and 4b show one example of a sequence according to an implementation of method N100. A raw image i110 is captured by an imaging sensor. Processing operations as described herein are performed to obtain image i150 from raw image i110. A pixel classification operation such as task U110 is performed on image i150 to generate pixel classification map i160. In this example, pixels corresponding to the subject's exposed face and raised hand are assigned to the matched class. A block classification operation such as task U220 is performed according to a partitioning of image i150 and pixel classification map i160. Based on the block classifications, an exposure control factor is generated, and the factor is applied to image i150 to obtain an exposure-adjusted image i170.

Figures 5A, 5B:
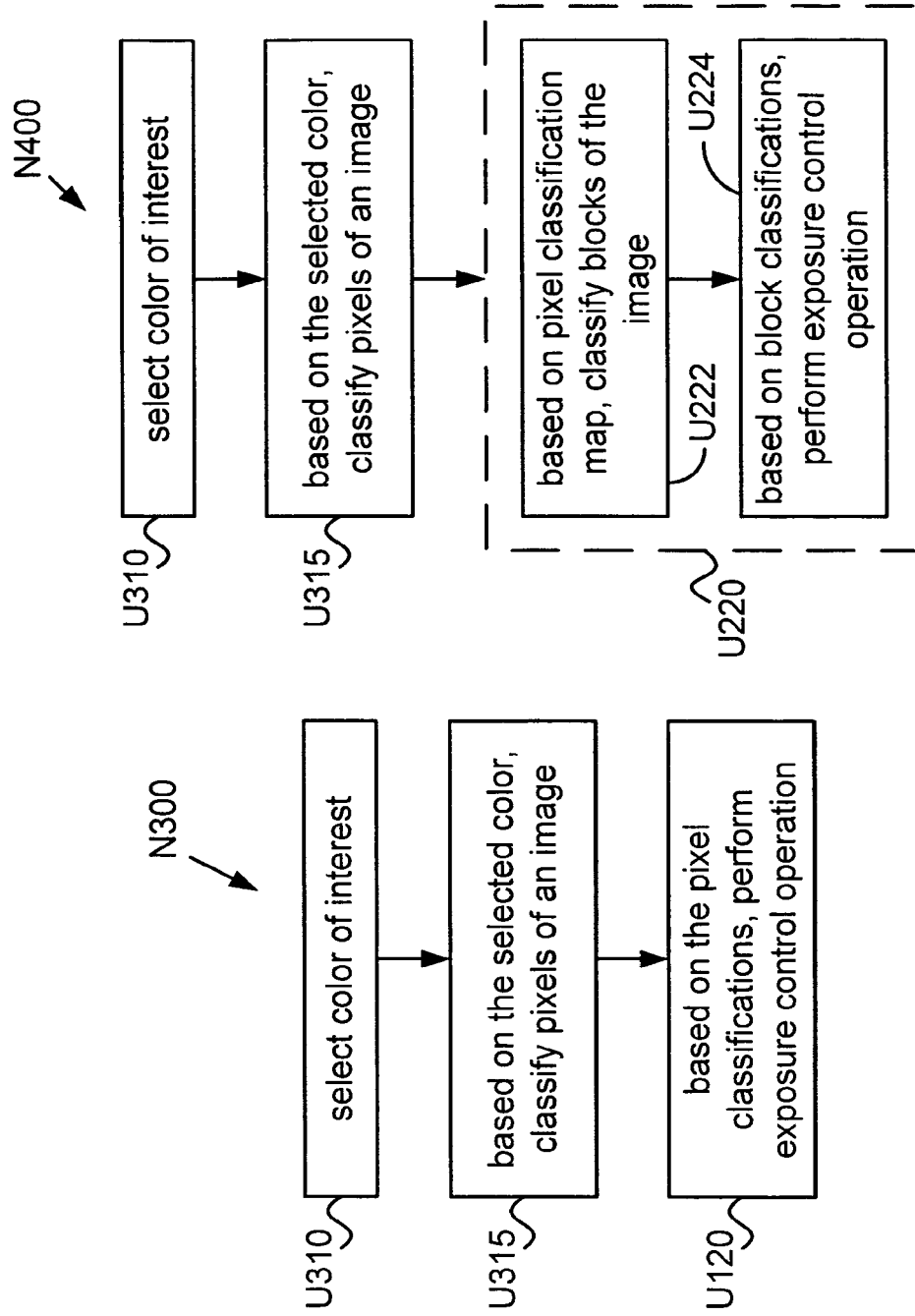
FIG. 5a is a flowchart of a method N300 according to an embodiment.
FIG. 5b is a flowchart of an implementation N400 of method N300.

In other applications, it may be desired to classify pixels of image i150 according to a color other than human skin color. For example, it may be desired to select a green of foliage such as trees and/or grass, a blue of sky or water, or a color of an animal, flower, or other object of interest. FIG. 5a shows a flowchart of a method N300 according to another embodiment that includes a task U310 of selecting a color of interest. Task U310 may include selecting the color of interest from a table displaying patches of two or more different colors, for example.

Alternatively, task U310 may include selecting the color of interest from image i150 itself. For example, an apparatus according to an embodiment may be configured to display image i150 (e.g., on an LCD (liquid crystal display) screen) and to allow an operator to use a mouse, 4-way navigation key or joystick, or other input device to select interactively a small region of the image. The size of the selection region may be preset (e.g., 3×3 or 5×5 pixels), user-selectable among more than one size, or user-adjustable. Such an apparatus may be configured to calculate an average color in that region and to perform pixel classification task U110 according to a specified range of that color. The apparatus may also be configured to display to the operator a block of the color to be matched.

Task U315 classifies pixels of image i150 according to the selected color. The segmentation may be described by a single boundary that indicates a region around the selected color. Alternatively, the segmentation region may be described by multiple boundaries, such as different segmentation boundaries in the CbCr plane for different corresponding ranges of luminance levels. The size and/or shape of a segmentation boundary may be characterized by one or more parameters, such as radius, which may be preset, selectable, and/or user-adjustable. In one example, the segmentation boundary is defined by a sphere of radius 5 pixels around the selected color value. Apart from the use of a different segmentation boundary, task U315 may be performed in the same manner as task U110 described above, and with any of the same alternative configurations, to produce a corresponding pixel classification map.

FIG. 5b shows a flowchart of a method N400 according to an embodiment that includes an implementation U220 of task U120 as described above. Such a method may also be configured to include an implementation U320 or U330 of task U220 as described above.

The performance of a pixel classification task U110 or U315 may be reduced in a case where the pixels in image i150 have very high or very low luminance values. For example, chrominance information derived from RGB values with very high or very low luminances may be less reliable and may lead to faulty pixel classification. In a method according to a further embodiment, tasks U110 (or U315) and U120 are repeated, this time upon the exposure-adjusted image (or an image based on this image). Such a method may be configured to trigger such iteration if an average luminance value of the matched pixels in the original image is excessively high or low, or if the proportion of the matched pixels having luminance values near either extreme meets or exceeds some threshold.

An intermediate or final result of a method N100, N200, N300, or N400 may be used in other processing operations. For example, a pixel classification map or block classification map may also be used to adjust a white balance operation. Such adjustment may include removing pixels of the selected color (e.g., human skin color) from consideration during the white balance operation, especially if the number of such pixels in the image is greater than a threshold proportion (alternatively, if the number of such blocks in the image is above a threshold value). Other operations in which such a map may be used include an automatic focus control operation.

One potential advantage of method N100, N200, N300, or N400 is to provide an appropriate brightness of skin color (or other selected color) in the adjusted image. For example, such a method may provide a more consistent skin color brightness over portraits taken before different backgrounds. In another application, the method is applied or reapplied after a resizing or recompositing operation (for example, an optical or digital zoom operation). An embodiment of such a method may be used in this manner to keep the brightness of skin color (or other selected color) at an appropriate level as that color range occupies proportionally more or less of the image.

One typical consequence of frame-average or center-weighted exposure control is that a very light or very dark background which occupies much of the image (or center region) is rendered inappropriately as gray. Another potential advantage of a method N100, N200, N300, or N400 is to produce an adjusted image in which the brightness of such a background more accurately depicts the brightness of the background in the original scene.

Figures 6A, 6B:
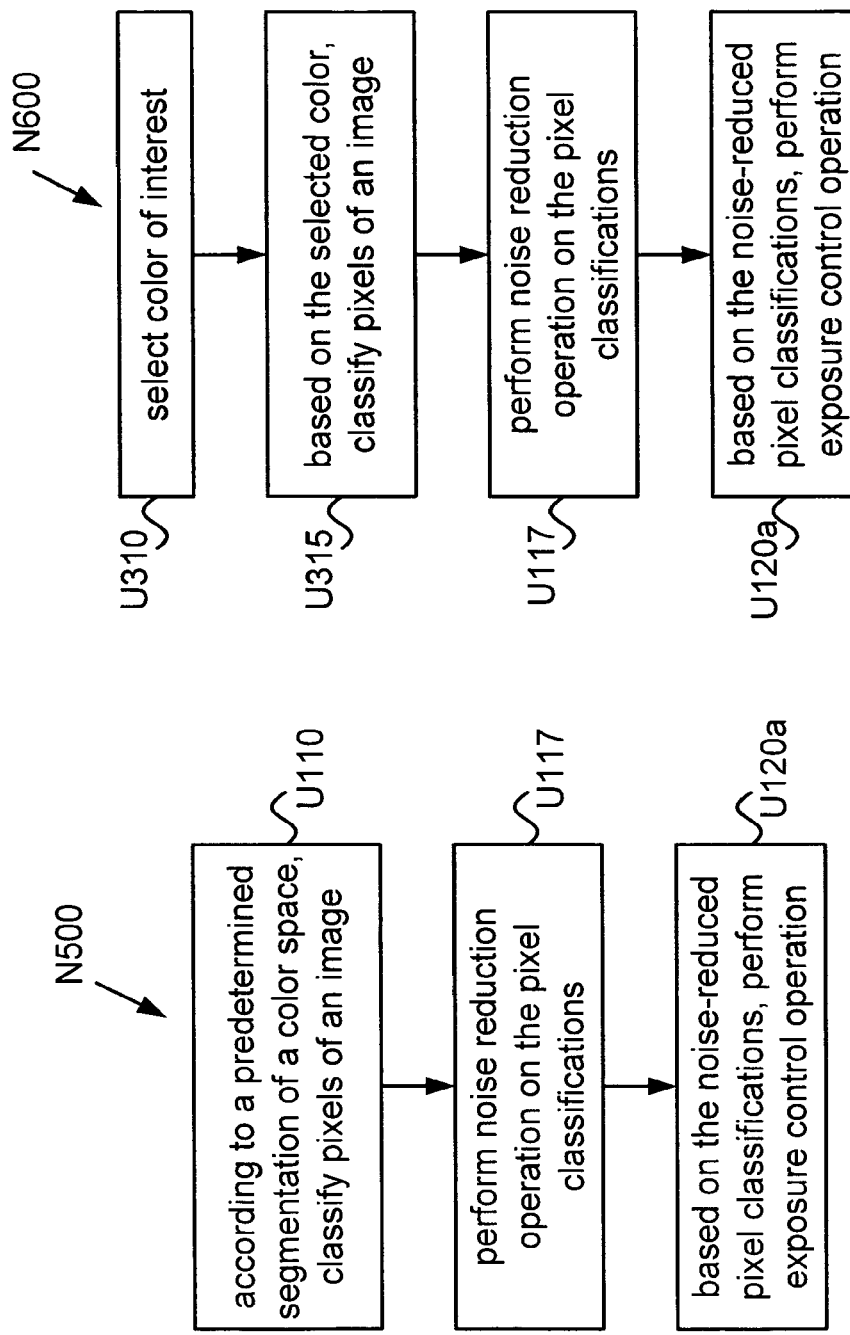
FIG. 6a is a flowchart of an implementation N500 of method N100.
FIG. 6b is a flowchart of an implementation N600 of method N300.

In further implementations of method N100, one or more enhancement operations are performed on the pixel classification map before it is used for block classification. For example, it may be desired to process the pixel classification map to remove speckle or other noise. FIGS. 6a and 6b show flowcharts of implementations N500 and N600 of methods N100 and N300, respectively, which include a task U117 configured to perform a noise reduction operation on the pixel classifications. In these examples, implementation U120a of task U120 is configured to perform an exposure control operation based on the noise-reduced pixel classifications.

Figure 7B:
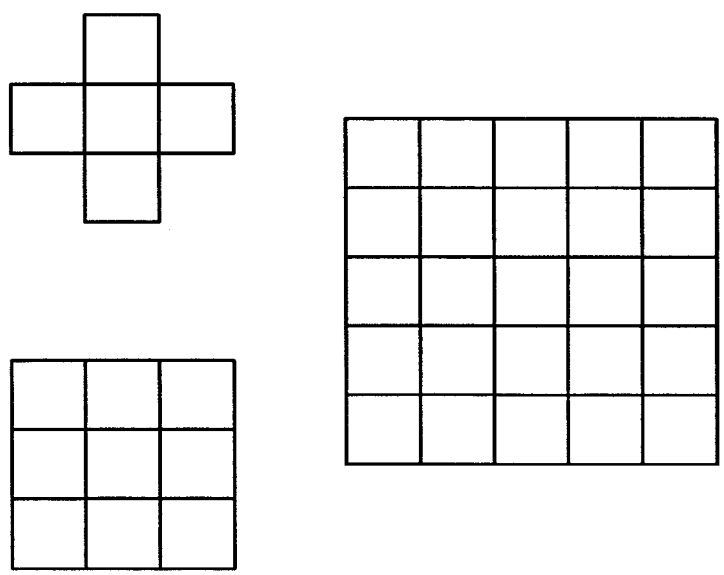
FIG. 7b shows a flowchart of an implementation U217 of noise reduction task U117.
Figure 7A:
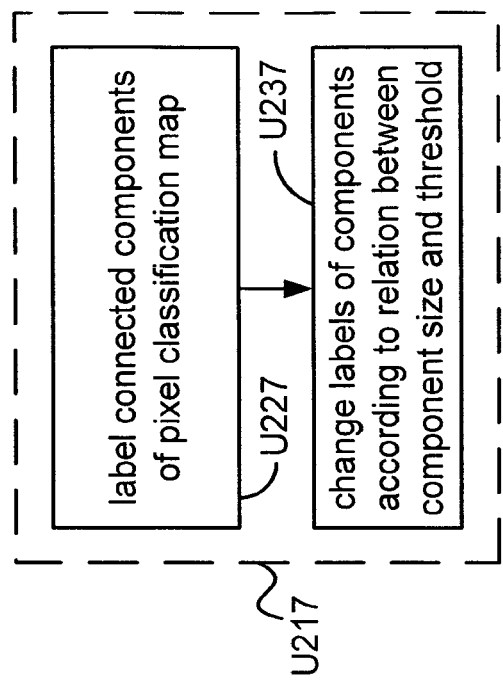
FIG. 7a shows several shapes of convolution masks that may be used to implement an averaging filter.

In one example, task U117 applies an averaging filter to the pixel classification map. FIG. 7a shows several shapes of convolution masks (square of size 3×3 pixels, square of size 5×5 pixels, cruciform) that may be used to implement such a filter, with regions along the map border being handled in any appropriate manner.

For a binary pixel classification map, task U117 may be configured to apply a mode filter to the pixel classification map. Such a filter may be implemented as a convolution mask configured to replace the value of a pixel with the most common value in the pixel's neighborhood. For a 3×3 mask, for example, such a filter may be implemented according to the following expression:

$$g(i, j) = \text{mode} \begin{Bmatrix} f(i-1, j-1), & f(i, j-1), & f(i+1, j-1), \\ f(i-1, j), & f(i, j), & f(i+1, j), \\ f(i-1, j+1), & f(i, j+1), & f(i+1, j+1) \end{Bmatrix},$$

where i and j denote row and column number, respectively, and f and g denote the original and noise-reduced pixel classification maps, respectively.

In another example, an implementation U217 of noise reduction task U117 performs a region labeling operation on the pixel classification map. Such an operation may be performed on a binary pixel classification map or on a pixel classification map having another limited number of classes. FIG. 7b shows a flowchart of task U217, in which task U227 labels connected components of the pixel classification map, and task U237 changes the labels of components according to a relation between component size and a threshold value.

In a typical example, task U237 is configured to change the labels of components having a size below a threshold value (alternatively, having a size not greater than a threshold value). The size of a component may be indicated by a characteristic such as the number of pixels in the component or the minimum dimension of the component, which characteristic may be calculated by task U237. Task U217 may be configured to perform task U237 only on connected components containing matched pixels or, alternatively, on all of the connected components.

Task U227 may be configured to apply any connected-component algorithm that is known or is to be developed and may use 4-connectivity, 8-connectivity, or some other criterion of neighborhood. A typical two-part example of such an algorithm proceeds as follows (ignoring special cases along the border of the map):

Part (I) For each row i from top to bottom, perform the following operation on element f(i, j) for each column j from left to right:

If the value of element f(i, j) is 1, then
  A) If the values of all four previously visited 8-connected neighbors of f(i, j) are 0, then assign a new label to f(i, j);
  B) else if only one of those neighbors has value 1, then assign its label to f(i, j);
  C) else record the equivalences of those neighbors having value 1, and assign one of their labels to f(i, j).

Part (II) Sort the recorded equivalences into equivalence classes, and assign a unique label to each equivalence class. Then scan the map again, replacing each label with the unique label assigned to its equivalence class.

It may be desirable to reduce the computational expense of a noise reduction operation. For example, it may be desirable to perform a noise reduction operation such as region labeling on a reduced version of pixel classification map i160. FIG. 8 shows a flowchart of an embodiment U317 of noise reduction task U217, which is configured to produce a pixel classification map based on map i160 and having a reduced size. After the noise reduction operation has been performed on the reduced map, the resulting map may be used to update pixel classification map i160 or, alternatively, may itself be used as the pixel classification map in one or more further tasks such as block classification. In this example, implementation U227a of task U227 is configured to label connected components of the reduced map.

Task U317 includes a task U327 that is configured to produce a reduced version of pixel classification map i160. Task U327 may be configured to calculate the reduced map using macroblocks. In the case of a binary pixel classification map, for example, task U327 may be configured to calculate the reduced map such that each of its elements is the mode of the corresponding macroblock of the pixel classification map. In the case of a pixel classification map having another limited number of classes, task U327 may be configured to calculate the reduced map such that each of its elements is the mode or, alternatively, the median of the corresponding macroblock.

By applying a partitioning of macroblocks of size 8×8, task U317 may be used to condense a pixel classification map of five million elements down to a reduced map of only about 80,000 elements. Such a reduction may be needed to make a region labeling operation feasible for a portable or embedded device such as a camera or camera phone. Similarly, it may be desired in some applications to perform pixel classification task U110 or U315 on an image of reduced size, each of whose pixels is the mean (alternatively, the median) of a corresponding macroblock of image i150.

FIG. 9 shows a block diagram of an apparatus 300 according to an embodiment. Sensor 110 includes an imaging sensor having a number of radiation-sensitive elements, such as a CCD or CMOS sensor. Processor 310 may be implemented as one or more arrays of logic elements such as microprocessors, embedded controllers, and IP cores. Memory 320 may be implemented as an array of storage elements such as semiconductor memory (which may include without limitation dynamic or static RAM, ROM, and/or flash RAM) or ferroelectric, magnetoresistive, ovonic, polymeric, or phase-change memory. Display 160 may be implemented as a LCD or OLED panel, although any display suitable for the particular application may be used. For example, an implementation of apparatus 300 may be included in a device such as a camera or cellular telephone.

In conjunction with memory 320, which may store instructions, image data, and/or segmentation data, processor 310 is configured to perform at least one implementation of method N100, N200, N300, N400, N500, and/or N600 as disclosed herein on an image based on an image captured by sensor 110. Processor 310 may also be configured to perform other signal processing operations on the image as described herein (such as black clamping, white balance, color correction, gamma correction, and/or color space conversion). Display 160 is configured to display an image captured by sensor 110 as processed by processor 310.

Figures 10A, 10B:
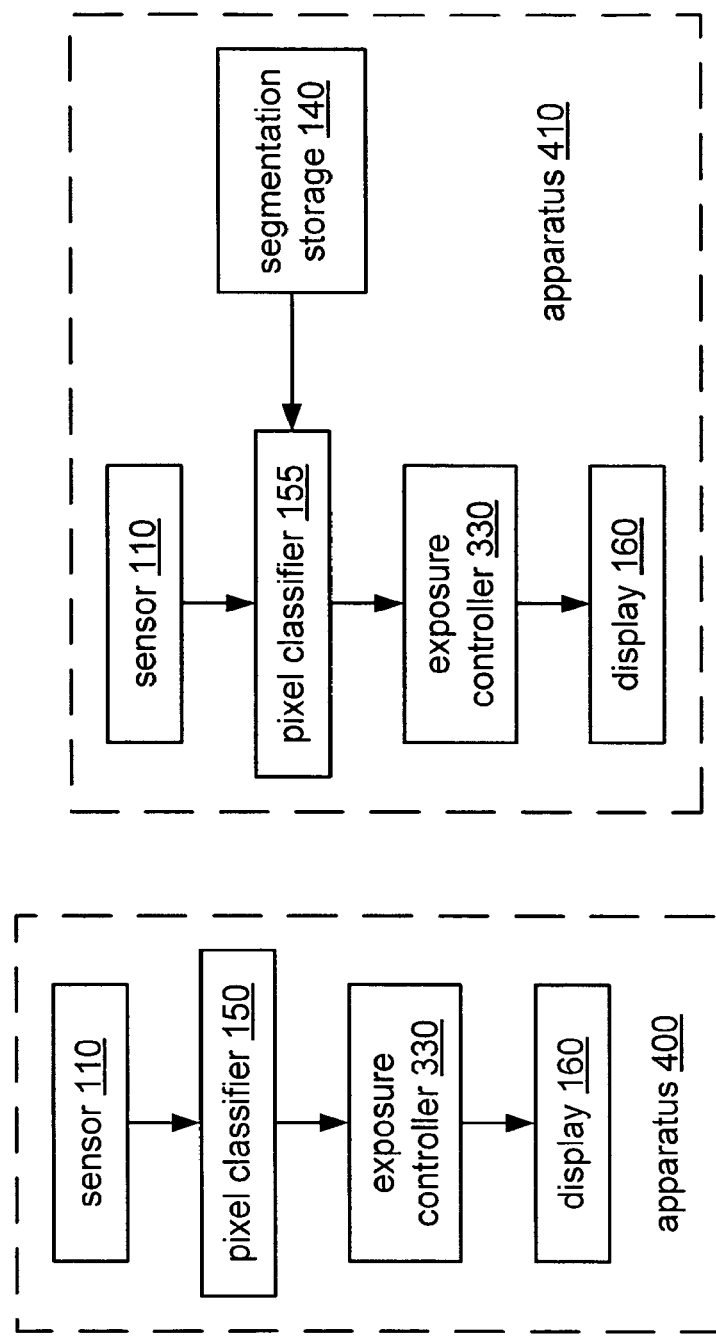
FIG. 10a shows a block diagram of an apparatus 400 according to an embodiment.
FIG. 10b shows a block diagram of an implementation 410 of apparatus 400.

FIG. 10a shows a block diagram of an apparatus 400 according to an embodiment. Pixel classifier 150 is configured to classify pixels of an image according to one or more implementations of task U110 or U315 as described herein. Pixel classifier 150 and/or apparatus 400 may also be configured to perform other signal processing operations on the image as described herein (such as black clamping, white balance, color correction, gamma correction, and/or color space conversion). Exposure controller 330 is configured to perform, based on the pixel classifications, an exposure control operation according to one or more implementations of task U120 as described herein. Display 160 is configured to display an image that is based on an image captured by sensor 110 and may also be processed according to the pixel classifications performed by pixel classifier 150.

Pixel classifier 150 and exposure controller 330 may be implemented as one or more arrays of logic elements such as microprocessors, embedded controllers, and IP cores, and/or as one or more sets of instructions executable by such an array or arrays. In the context of a device or system including apparatus 400, such array or arrays may also be used to execute other sets of instructions, such as instructions not directly related to an operation of apparatus 400. In one example, pixel classifier 150 and/or exposure controller 340 are implemented within a mobile station chip or chipset configured to control operations of a cellular telephone.

Further implementations of apparatus 300 or 400 may include one or more lenses in the optical path of the sensor, which lens or lenses may include an adjustable aperture and/or focusing capability. Implementations of apparatus 300 or 400 may also include an infrared- and/or ultraviolet-blocking filter in the optical path of the sensor. The range of implementations for apparatus 300 and/or 400 include portable or hand-held devices such as digital still or video cameras and portable communications devices including one or more cameras, such as a cellular telephone.

FIG. 10b shows a block diagram of an implementation 410 of apparatus 400. Segmentation storage 140 stores one or more segmentations of a color space, each segmentation being derived from a corresponding set of predicted responses of sensor 110. Such segmentation or segmentations may be derived, without limitation, according to one or more implementations of a method M500 and/or M600 as described in the incorporated U.S. patent application Ser. No. 11/208,261. Segmentation storage 140 may be implemented as a portion of a memory 320 as described above. Implementation 155 of pixel classifier 150 is configured to classify pixels of an image according to one or more of the segmentations of segmentation storage 140. For example, pixel classifier 155 may be configured to classify pixels of an image according to one or more implementations of task U110 as described herein.

Figure 11B:
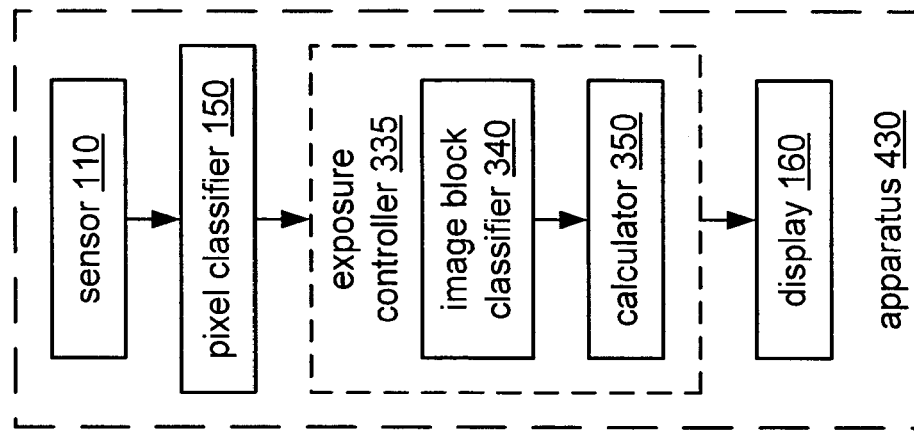
FIG. 11b shows a block diagram of an implementation 430 of apparatus 400.
Figure 11A:
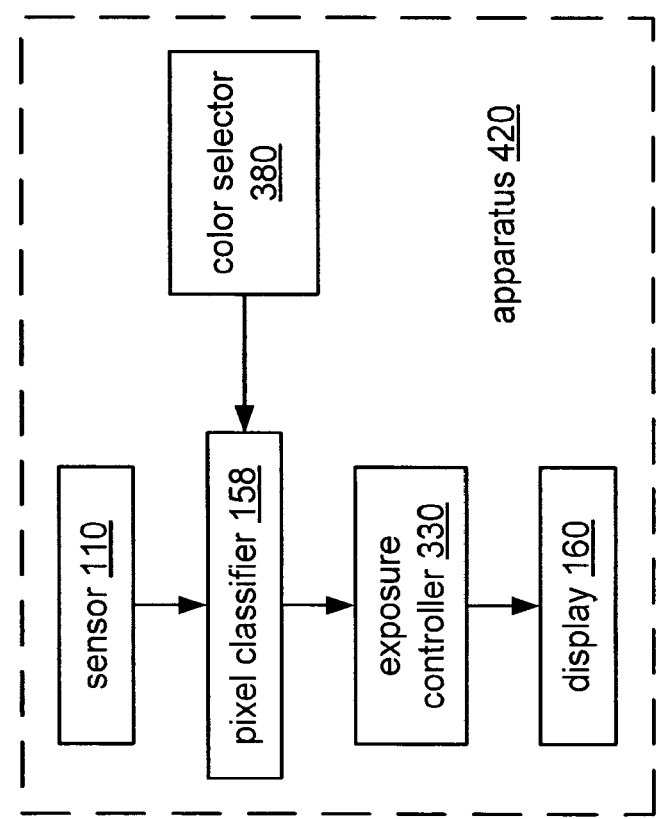
FIG. 11a shows a block diagram of an implementation 420 of apparatus 400.

FIG. 11a shows a block diagram of an implementation 420 of apparatus 400. Color selector 380 is configured to obtain a color selected according to task U310 and to describe a corresponding segmentation region to pixel classifier 158. For example, color selector 380 may be configured to support color selection, by a user of apparatus 420, via display 160 and an input device (e.g., a 4-way navigation key). Color selector 380 may be implemented as an interactive routine in software and/or firmware executable by an array of logic elements of apparatus 420, which array may also be configured to execute instructions of pixel classifier 158. Implementation 158 of pixel classifier 150 is configured to classify pixels of an image according to the selected color. For example, pixel classifier 158 may be configured to classify pixels of an image according to one or more implementations of task U315 as described herein.

FIG. 11b shows a block diagram of an implementation 430 of apparatus 400. Implementation 335 of exposure controller 330 includes an image block classifier 340 and a calculator 350. Image block classifier 340 is configured to classify blocks of an image according to the pixel classifications produced by pixel classifier 150. For example, image block classifier 340 may be configured to perform one or more implementations of task U222 as described herein. Calculator 350 is configured to calculate an exposure control factor according to the block classifications produced by image block classifier 340. For example, calculator 350 may be configured to perform one or more implementations of task U320 as described herein. Pixel classifier 150, image block classifier 340, and calculator 350 may be implemented as one or more arrays of logic elements such as microprocessors, embedded controllers, and IP cores, and/or as one or more sets of instructions executable by such an array or arrays.

The foregoing presentation of the described embodiments is provided to enable any person skilled in the art to make or use the present invention. Various modifications to these embodiments are possible, and the generic principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

A method or apparatus according to an embodiment may be configured to perform one or more additional operations on an exposure-adjusted image, such as an encoding or compression operation according to a standard format such as JPEG, PNG, MPEG, or Quicktime; an image recognition, face recognition, or identity authentication operation; and/or transmission of the image from a device such as a cellular telephone.

An embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, magnetoresistive, ovonic, polymeric, or phase-change memory; or a disk medium such as a magnetic or optical disk.

Although CCD and CMOS sensors are mentioned herein, the term "imaging sensor" includes any sensor having a plurality of light-sensitive sites or elements, including amorphous and crystalline silicon sensors as well as sensors created using other materials, semiconductors, and/or heterojunctions. The principles disclosed herein may also be applied to other image-forming apparatus such as apparatus for automatically printing a color film image onto photosensitive paper, inkjet or laser printers, photocopiers, scanners, and the like. Thus, the present invention is not intended to be limited to the embodiments shown above but rather is to be accorded the widest scope consistent with the principles and novel features disclosed in any fashion herein.

What is claimed is:

1. A method of image processing, said method comprising:
capturing a raw image using an image sensor;
processing the raw image into an intermediate image, wherein said processing increases a reliability of a plurality of pixels of the intermediate image for subsequent classification;
classifying each of the plurality of pixels of the intermediate image according to a predetermined segmentation of a color space, wherein said classifying each of the plurality of pixels of the intermediate image includes calculating values of elements of a pixel classification map;
performing a noise reduction operation on the pixel classification map; and
performing an exposure control operation based on the noise-reduced pixel classification map, wherein the predetermined segmentation of the color space is based on a plurality of predicted responses of the image sensor.

2. The method of image processing according to claim 1, wherein the predetermined segmentation of the color space is based on a plurality of predicted responses of the image sensor to human skin surfaces.

3. The method of image processing according to claim 1, wherein said classifying each of the plurality of pixels according to a predetermined segmentation includes assigning each of the plurality of pixels, according to a relation between the predetermined segmentation and a color value of the pixel, to one among a first pixel class and a second pixel class, and
wherein said performing an exposure control operation includes assigning each of a plurality of blocks of the intermediate image to one among a first block class and a second block class according to a relation between (A) a number of pixels in the block that are assigned to the first pixel class and (B) a threshold value, and
wherein said performing an exposure control operation includes calculating an exposure control factor based on an average luminance value of the blocks assigned to the first block class.

4. The method of image processing according to claim 1, wherein said performing an exposure control operation includes calculating an exposure control factor based on a result of said classifying each of the plurality of pixels and changing, according to the exposure control factor, a luminance value of each of the plurality of pixels of the intermediate image.

5. The method of image processing according to claim 1, wherein said performing an exposure control operation includes:
according to a result of said classifying each of the plurality of pixels, assigning each of a plurality of blocks of the intermediate image to one among a plurality of block classes; and
based on an average luminance value of the blocks of one of the plurality of block classes, calculating an exposure control factor.

6. The method of image processing according to claim 5, wherein said performing an exposure control operation includes changing, according to the exposure control factor, a luminance value of each of the plurality of pixels of the intermediate image.

7. A computer-readable non-transitory data storage medium storing machine-executable instructions that when executed perform the method of image processing according to claim 1.

8. An apparatus comprising:
a sensor configured to capture a raw image;
a processor configured to process the raw image into an intermediate image, wherein said processing increases a reliability of a plurality of pixels of the intermediate image for subsequent classification;
a pixel classifier configured to classify, according to a predetermined segmentation of a color space, each of the plurality of pixels of the intermediate image, wherein said classifying each of the plurality of pixels of the intermediate image includes calculating values of elements of a pixel classification map;
said apparatus configured to perform a noise reduction operation on the pixel classification map; and
an exposure controller configured to perform an exposure control operation based on the noise-reduced pixel classification map, wherein the predetermined segmentation of the color space is based on a plurality of predicted responses of the sensor.

9. The apparatus according to claim 8, wherein the predetermined segmentation of the color space is based on a plurality of predicted responses of the sensor to human skin surfaces.

10. The apparatus according to claim 8, wherein said pixel classifier is configured to assign each of the plurality of pixels, according to a relation between the predetermined segmentation and a color value of the pixel, to one among a first pixel class and a second pixel class, and
wherein said exposure controller is configured to assign each of a plurality of blocks of the intermediate image to one among a first block class and a second block class according to a relation between (A) a number of pixels in the block that are assigned to the first pixel class and (B) a threshold value, and
wherein said exposure controller is configured to calculate an exposure control factor based on an average luminance value of the blocks assigned to the first block class.

11. The apparatus according to claim 8, wherein said exposure controller is configured to calculate an exposure control factor based on the pixel classifications and to change, according to the exposure control factor, a luminance value of each of the plurality of pixels of the intermediate image.

12. The apparatus according to claim 8, wherein said exposure controller includes an image block classifier configured to assign, according to the pixel classifications, each of a plurality of blocks of the intermediate image to one among a plurality of block classes, and
wherein said exposure controller includes a calculator configured to calculate, based on an average luminance value of the blocks of one of the plurality of block classes, an exposure control factor.

13. The apparatus according to claim 12, wherein said exposure controller is configured to change, according to the exposure control factor, a luminance value of each of the plurality of pixels of the intermediate image.

14. The apparatus of claim 8, wherein the apparatus comprises a camera.

15. The apparatus of claim 8, wherein the apparatus comprises a wireless communications device.

16. An image processing system, comprising:
means for processing a raw image into an intermediate image, wherein said processing increases a reliability of a plurality of pixels of the intermediate image for subsequent classification;
means for classifying each of the plurality of pixels of the intermediate image according to a predetermined segmentation of a color space, wherein said classifying each of the plurality of pixels of the intermediate image includes calculating values of elements of a pixel classification map;
means for performing a noise reduction operation on the pixel classification map; and
means for performing an exposure control operation based on the noise-reduced pixel classification map, wherein the predetermined segmentation of the color space is based on a plurality of predicted responses of an image sensor used to capture the raw image.

17. The image processing system of claim 16, wherein the predetermined segmentation of the color space is based on a plurality of predicted responses of the image sensor to human skin surfaces.

18. A method of image processing, said method comprising:
capturing a raw image using an image sensor;
processing the raw image into an intermediate image;
classifying each of a plurality of pixels of the intermediate image according to a predetermined segmentation of a color space, wherein said classifying includes calculating values of elements of a pixel classification map;
performing a noise reduction operation on the pixel classification map; and
performing an exposure control operation based on the noise-reduced pixel classification map,
wherein the predetermined segmentation of the color space is based on a plurality of predicted responses of the image sensor.

19. An apparatus comprising:
a sensor configured to capture a raw image;
a processor configured to process the raw image into an intermediate image;
a pixel classifier configured to classify, according to a predetermined segmentation of a color space, each of a plurality of pixels of the intermediate image, the pixel classifier further configured to calculate values of elements of a pixel classification map, the pixel classifier further configured to perform a noise reduction operation on the pixel classification map; and
an exposure controller configured to perform, based on the noise-reduced pixel classification map, an exposure control operation,
wherein the predetermined segmentation of the color space is based on a plurality of predicted responses of the sensor.

* * * * *